(12) United States Patent
Moravec et al.

(10) Patent No.: US 8,462,462 B1
(45) Date of Patent: Jun. 11, 2013

(54) LOCALIZED HEATING FOR FLIP CHIP BONDING (75) Inventors: Mark D. Moravec, Lamlukka (TH); Lei Wang, Fremont, CA (US); Wentao Yan, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 53 days.

(21) Appl. No.: 13/277,993

(22) Filed: Oct. 20, 2011

(51) Int. Cl.
*G11B 21/16* (2006.01)

(52) U.S. Cl.
USPC ................................... 360/125.31

(58) Field of Classification Search
USPC ................................... 360/125.31
See application file for complete search history.

(56) References Cited

U.S. PATENT DOCUMENTS

| | | | |
|---|---|---|---|
| 3,289,046 A | 11/1966 | Carr | |
| 4,582,975 A | 4/1986 | Daughton | |
| 4,769,525 A | 9/1988 | Leatham | |
| 5,010,233 A | 4/1991 | Henschen et al. | |
| 5,175,409 A | 12/1992 | Kent | |
| 5,541,524 A | 7/1996 | Tuckerman et al. | |
| 6,396,706 B1 | 5/2002 | Wohlfarth | |
| 6,423,939 B1 | 7/2002 | Pan | |
| 6,492,620 B1 | 12/2002 | Lau | |
| 6,911,624 B2 | 6/2005 | Koopmans | |
| 7,272,883 B2 * | 9/2007 | Le et al. | 29/603.16 |
| 8,014,101 B2 * | 9/2011 | Shimazawa et al. | 360/125.31 |
| 8,018,685 B2 * | 9/2011 | Shimazawa et al. | 360/245.3 |

FOREIGN PATENT DOCUMENTS

GB 2 345 453 12/2000

* cited by examiner

*Primary Examiner* — Mark Blouin (57) ABSTRACT

Embodiments of the present invention relate to integral heating elements in solder pads for flip chip bonding. The integral heating elements are used to solder components together without exposing other locations and components in the assembly to potentially damaging temperatures. Embodiments of the invention may be used in manufacture of magnetic heads for EAMR hard disks to bond a laser sub-mount to an air-bearing slider without exposing magnetic head components to high temperatures.

26 Claims, 8 Drawing Sheets

LOCALIZED HEATING FOR FLIP CHIP BONDING

TECHNICAL FIELD

This invention relates to the field of interconnecting semiconductor devices and more specifically, to localized solder pad heating for flip chip bonding.

BACKGROUND

Information storage devices are used to retrieve and/or store data in computers and other consumer electronics devices. A magnetic hard disk drive is an example of an information storage device that includes one or more heads that can both read and write, but other information storage devices also include heads sometimes including heads that cannot write. For convenience, all heads that can read are referred to as "read heads" herein, regardless of other devices and functions the read head may also perform (e.g. writing, flying height control, touch down detection, lapping control, etc).

In a modern magnetic hard disk drive device, each read head is a sub-component of a head gimbal assembly (HGA). The read head typically includes a slider and a read/write transducer. The read/write transducer typically comprises a magneto-resistive read element (e.g. so-called giant magneto-resistive read element, or a tunneling magneto-resistive read element) and an inductive write structure comprising a flat coil deposited by photolithography and a yoke structure having pole tips that face a disk media.

Energy assisted or heat assisted magnetic recording (EAMR) exploits the drop in a magnetic medium's coercivity when the disk's temperature is raised to near the Curie level. This allows use of magnetic media with high room-temperature coercivities by heating the media prior to the write operation.

In an EAMR disk drive, an energy source, such as a laser, is coupled to the read head. For example, the energy source may be coupled to the back of the slider. The head further comprises a module for delivering the energy to the hard disk. For example, a near-field transducer (NFT) may be used to the transmit the energy from the energy source to the hard disk.

A sub-assembly comprising the laser and associated components (the "laser mount") is typically bonded to the slider by soldering. However, the high temperatures used to re-flow the solder to bond the laser mount to the slider may be harmful to the magnetic head. Additionally, the soldering temperatures may exacerbate thermal mismatch between the different materials to be joined.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth, such as examples of specific layer compositions and properties, to provide a thorough understanding of various embodiment of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

The terms "over," "under," "between," and "on" as used herein refer to a relative position of one layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Embodiments of the present invention relate to integral heating elements in solder pads for flip chip bonding. The integral heating elements are used to solder components together without exposing other locations and components in the assembly to potentially damaging temperatures. Embodiments of the invention may be used in manufacture of magnetic heads for EAMR hard drives to bond a laser sub-mount to an air-bearing slider without exposing magnetic head components to high temperatures. Other embodiments may be used in the manufacture of other electrical assemblies in the flip-chip industry.

Figure 1:
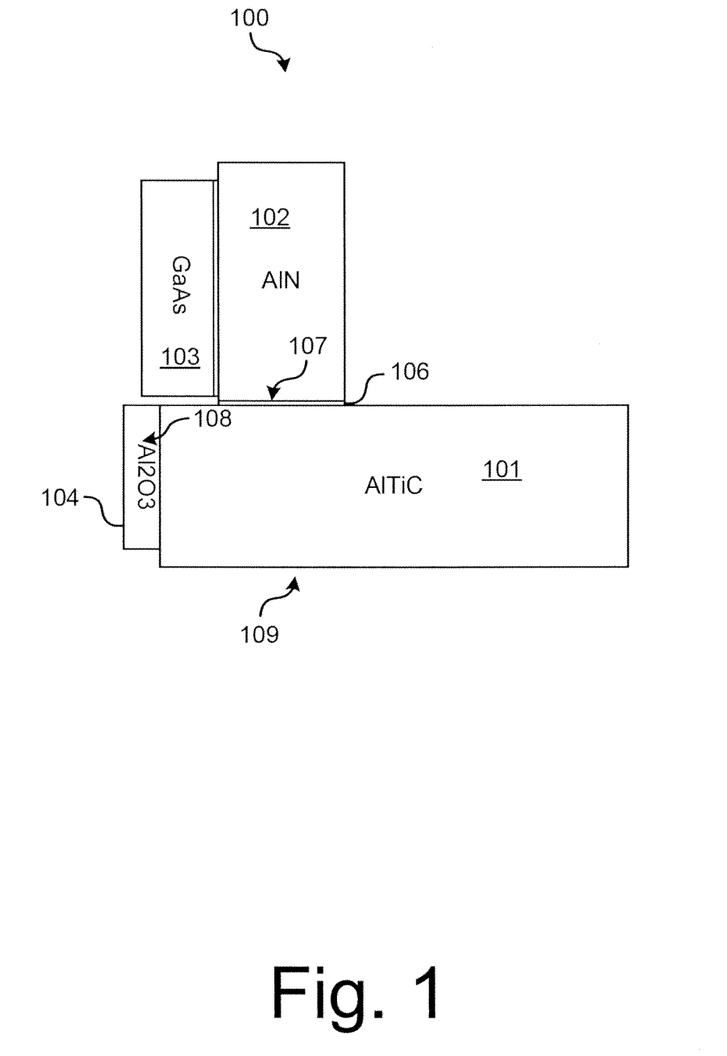
FIG. 1 illustrates a slider with laser mount assembly for use in a magnetic head.

FIG. 1 illustrates an integrated slider 100 with laser mount assembly for use in a magnetic head in accordance with an embodiment of the invention. In the illustrated embodiment, a slider (as a substrate) 101 is patterned with a heating element 106. In the illustrated embodiment, the substrate 101 comprises a AlTiC substrate with an air bearing surface 109, forming a slider for a magnetic head.

The heating element 106 comprises a thin-film resistor, such as a NiFe alloy. Heating element 106 is located at a first location 107 to bond a component 102 to the substrate 101. Solder (not pictured) is used to form a joint between the component 102 and the substrate 101. The heater 106 is used to melt the solder to form the solder joint. In the illustrated embodiment, the heater 106 is configured such that when the heater 106 melts the solder, a second location 108 remains below a predetermined temperature. For example, the predetermined temperature may be a temperature limit for a second component 104 deposited on a wafer to form the substrate 101 at the second location 108.

The illustrated first component 102 comprises a laser sub-mount. The laser sub-mount 102 provides a substrate for a laser 103. In the illustrated embodiment, the laser sub-mount 102 is composes of AlN and the laser 103 comprises a GaAs laser.

In this embodiment, the substrate 101 further comprises a second component formed on AlTiC substrate in wafer fabrication process at a second location 108 on the substrate 101. The second component 104 at the second location 108 comprises magnetic head components. A layer of predominately $Al_2O_3$ embeds these components, which may include the magnetic elements, a waveguide for the laser 103, and a near field transducer for transmitting the laser energy to the hard disk.

Figure 2:
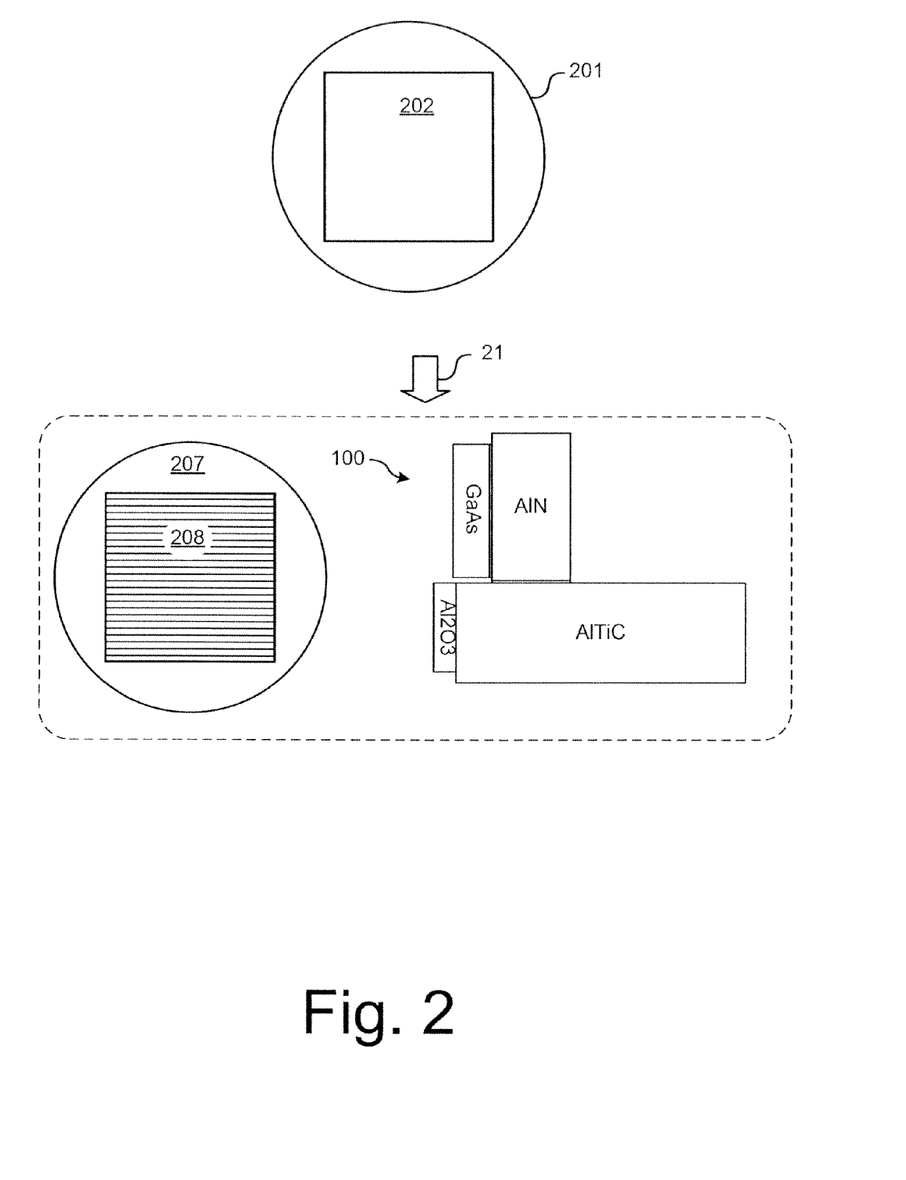
FIG. 2 illustrates a manufacturing process for bonding laser mount assemblies to sliders.

FIG. 2 illustrates a manufacturing process flow for manufacturing the embodiment illustrated in FIG. 1. In the illustrated process, a region 202 of a wafer 201, such as a wafer of AlTiC, is fabricated to produce a plurality of devices deposited on the wafer. For example, a plurality of magnetic heads. After the magnetic heads are deposited onto the wafer, the region 202 is diced into row bars, and one of the diced facet is polished and etched to provide an air bearing surface (ABS) for a plurality of sliders.

In step 21, the row bars 208 are stacked and bonded to a carrier, so that the face opposite the polished ABS is upwards. This forms a pseudo-wafer 207. This pseudo-wafer 207 allows the heating element and the solder pad to be deposited on the surface of the row bars opposite to the ABS, in order for the laser sub-mount components to be bonded to the slider to from the head assembly 100 illustrated in FIG. 1.

In other embodiments, other methods of assembly may be used. Alternatively, the illustrated method steps may be modified or performed in other orders. For example, step 21 might be performed before ABS is formed.

FIGS. 3A-D illustrate a process flow for providing integral heating element and solder pads onto a substrate and bonding a sub assembly to the substrate. In the illustrated embodiment, a thin insulating film 302 is deposited on the substrate 301. For example, the film may be 50-300 nm,—or more particularly, 100 nm—of $Al_2O_3$ or some other thermally and/or electrically insulating material. In the illustrated embodiment, the substrate 301 comprises an AlTiC substrate that is electrically conductive, and the film keeps the substrate electrically isolated and impedes heat transfer to the substrate where devices susceptible to thermal damage may reside. In other embodiments, the film 301 may be foregone, or other films may be deposited over the substrate. In still further embodiments, electrical devices may be formed on the substrate, and the method may be used to deposited solder pads for connecting the devices to external systems or components.

Figure 3A:
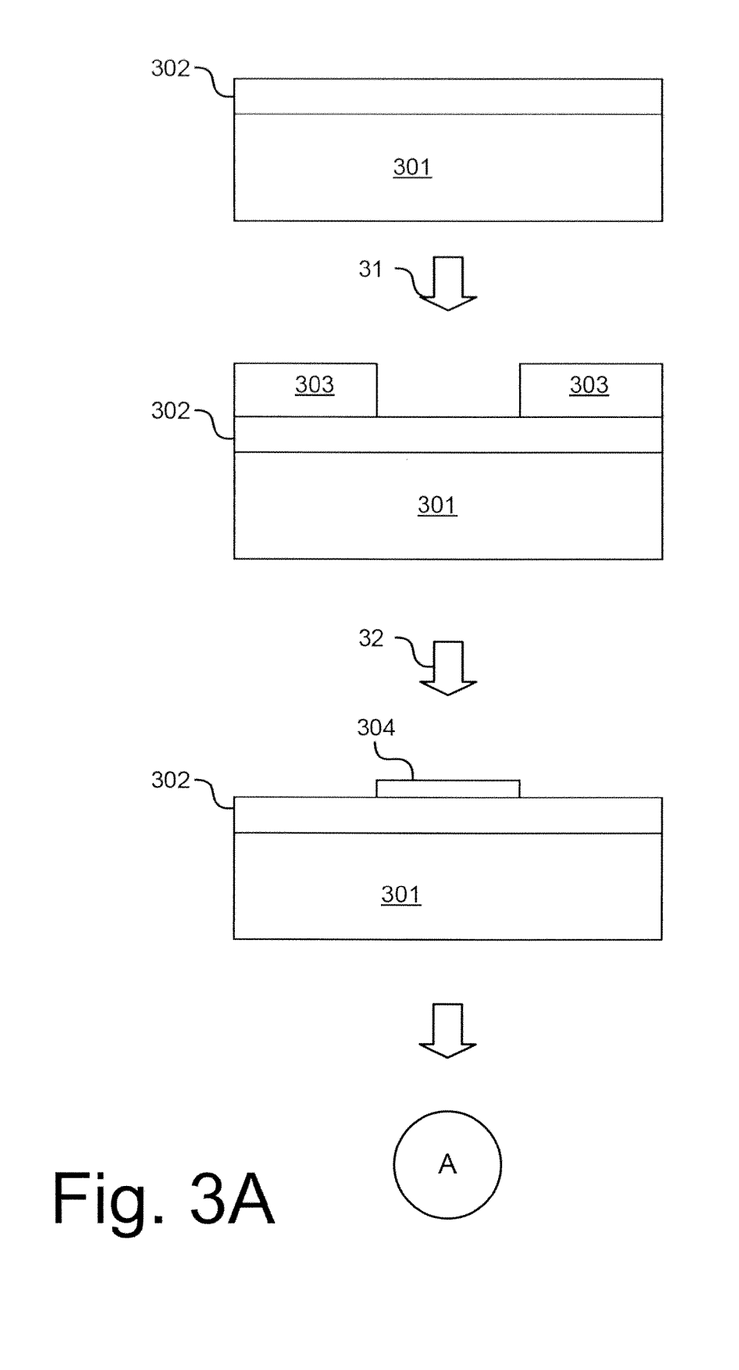
FIGS. 3A-D illustrate a process for depositing an integrated solder heater and soldering a component to a substrate.

In step 31, a photoresist pattern 303 is laid down to provide a pattern for the integral heating element for the solder pad. In step 32, the heater 304 is deposited, and the photoresist 303 is lifted off. In the illustrated embodiment, the heater 304 comprises a thin film resistor, such as NiFe. The thickness of the heating element 304 may vary according to the size of the heater, the solder to be used in the application, the material used for the heather, the desired heating time to melt the solder, and other process variables. For example, in some embodiments, a thin film between 25-500 nm of NiFe is used. In a particular example, the heater comprises 200 nm of NiFe.

Figure 3B:
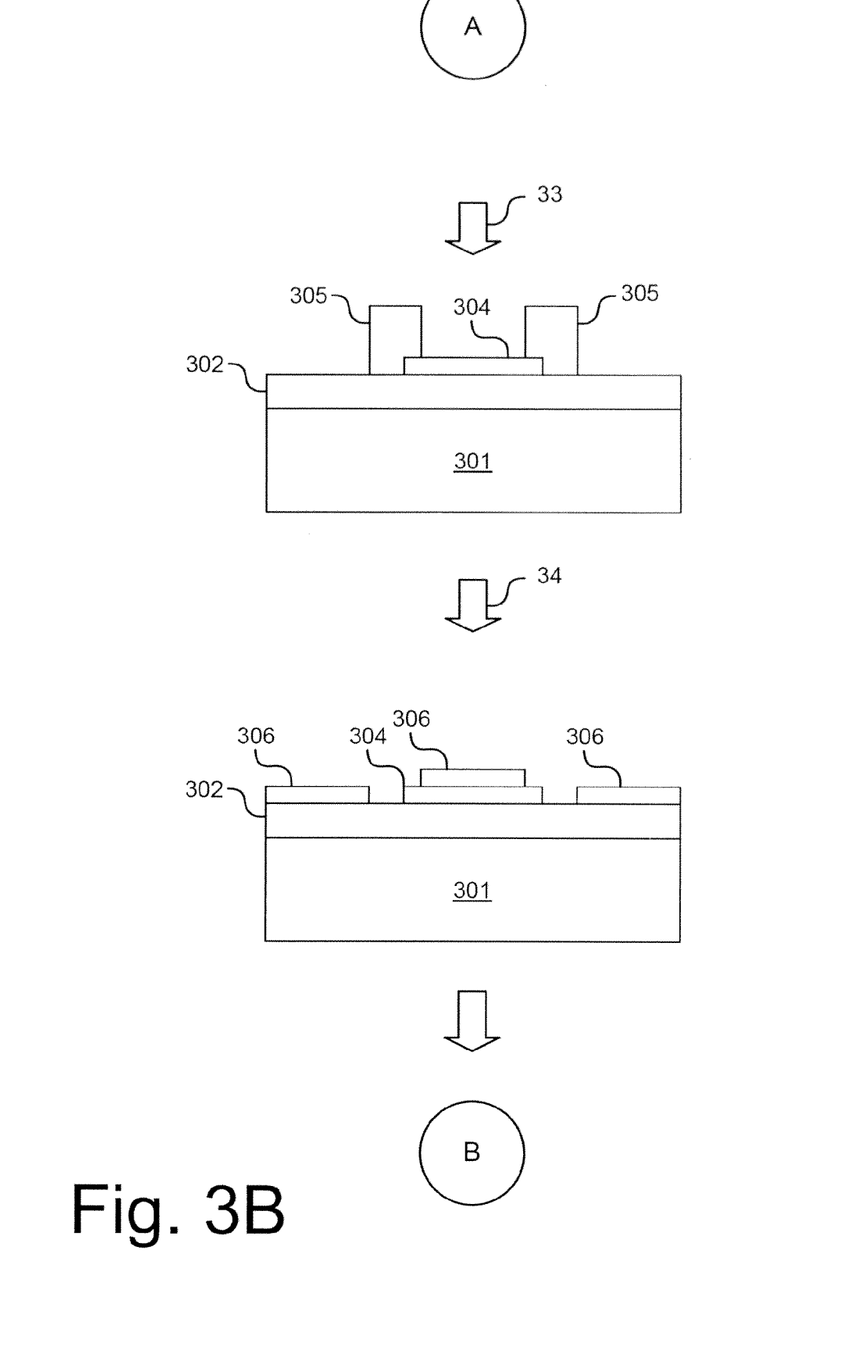

In step 33, a second photolithographic pattern is used to deposit photoresist 305 for providing electrical contacts for the heater 304. In step 34, a second deposition of insulating material 306 is applied to the assembly and the photoresist 305 is lifted off. The photoresist 305 is used to protect predetermined regions of the heaters from the second deposition of insulating material. Accordingly, after lift-off, portions of the heater 304 are exposed for bonding with electrical contacts. In some embodiments, the electrical contacts are sacrificial, meaning that after use to solder the assemblies, or after further manufacturing steps, the contacts are no longer accessible.

Figure 3C:
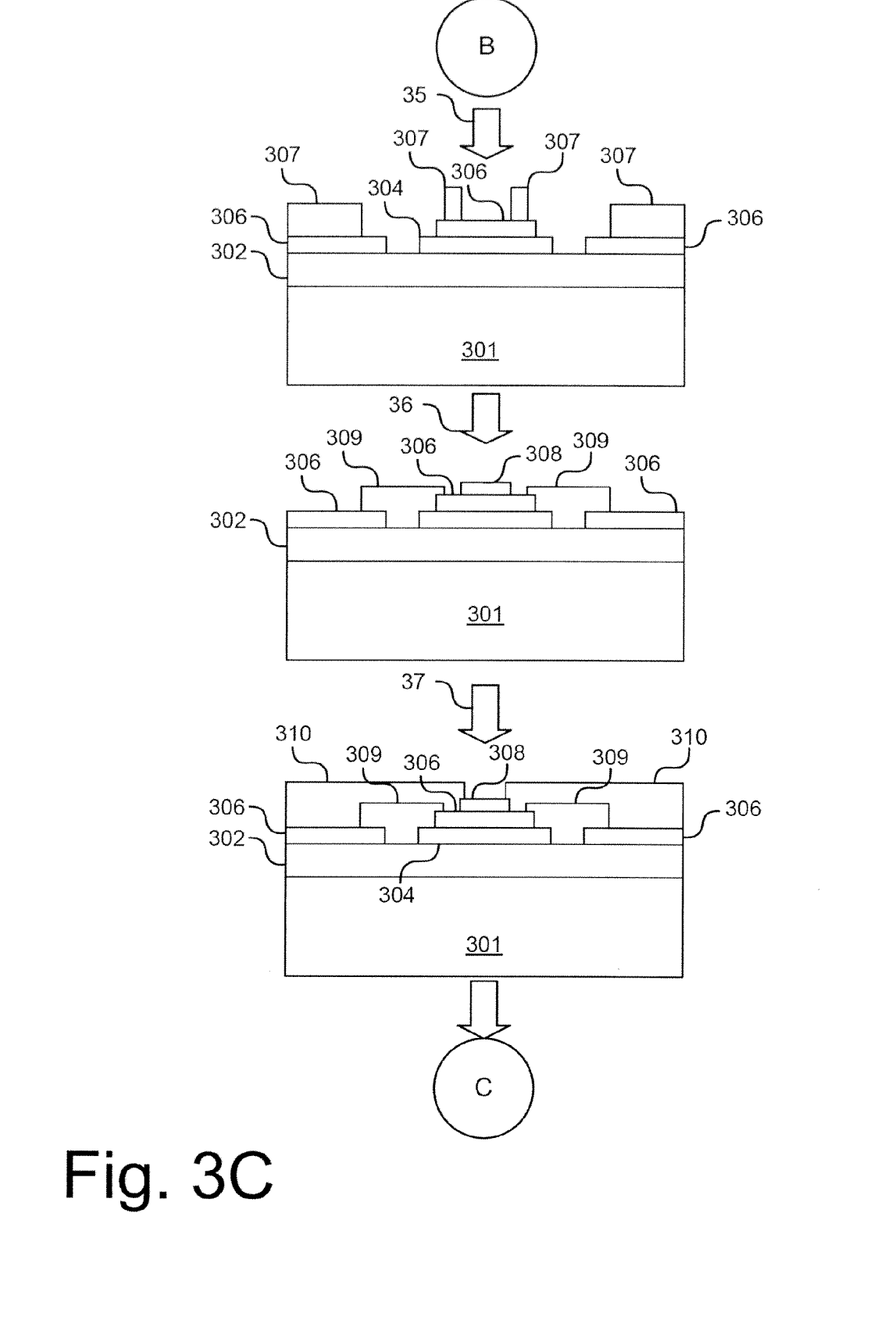

In step 35, a third lithographic patterning is used to apply a pattern of photoresist 307 for laying down the electrical contacts and an under bump metallization (UBM) layer. In step 36, the UBM 308 and contacts 309 are applied. In the illustrated embodiment, the UBM 308 and contacts 309 are composed of the same material and deposited in the same process. However, in other embodiments, the UBM 308 and contacts 309 may be deposited in separate processes. In the illustrated embodiment, the desired make-up of the UBM 308 dictates the composition of the contacts and typical industry UBM 308 compositions may be employed. For example, in one embodiment, the UBM 308 and contacts 309 comprise multiple layers, such as a 50 nm layer of Ti, a 200 nm layer of Pt, and a 100 nm layer of Au. Additionally, some of the layers may be sacrificial, for example, the Au layer may be incorporated into the eventual solder joint. In some embodiments, the UBM is disposed over the heater 304 such that the heater is completely covered by the UBM (except for the contact portions of the heater 304). In other embodiments, the heater is slightly offset from the UBM, such that a portion of the heater extends past the edge of the UBM. The configuration of the UBM 308 and the solder with respect to the heater may be adjusted to provide a desired thermal profile during soldering for the surrounding assembly.

Figure 3D:
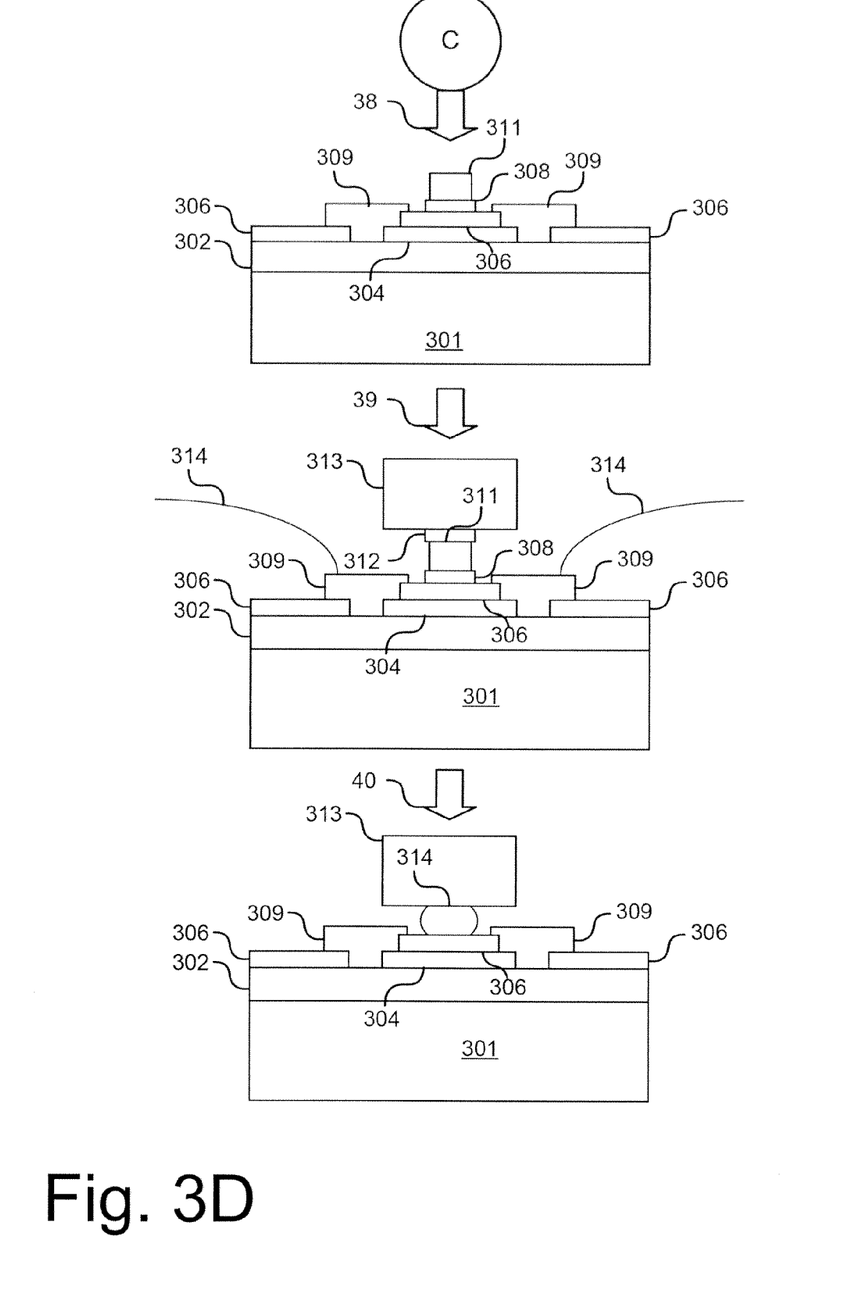

In step 37, a fourth lithographic patterning process is used to apply a pattern of photoresist 310 for the application of solder to the UBM 308. In step 38, the solder material 311 is applied and the photoresist 310 is lifted off. In the illustrated embodiment, the solder material 311 comprises a layer of Sn, such as a 3 μm layer of Sn. During soldering, the Sn 311 alloys with the Au in the UBM on the substrate 301 and on the associated laser sub-mount UBM, forming an SnAu solder. In other embodiments, different materials and thicknesses of the materials may be used as desired.

After step 38, a component 313 is applied to the solder pad 311 and electrical connectors 314 are applied to the contacts 309. In the illustrated embodiment, the component 313 is a laser sub-mount. However, other applications will employ various other types of components 313. In step 39, current is supplied via the connections 314 and the contacts 309 to the heater 304. The heater 304 rises in temperature, thereby, heating the UBM 308 and solder pad 311 to the solder's melting temperature. During the illustrated soldering process, the Au in the UBM 308 and Au on a solder pad 312 provided on the component 313 are incorporated into a solder alloy with the Sn solder material 311. The resultant solder joint 314 bonds the component 313 to the substrate 301.

In embodiments of the invention, the heater 304 heats of the solder pad 311 to its melting temperature without raising the temperature of a predetermined second location above a predetermined threshold temperature. For example, the heater 304 may heat the solder 311 without heating the location of a magnetic head device of the substrate 301 above the magnetic head's damage threshold.

In this embodiment, a transient current pulse is provided to the heater. The transient current pulse is sufficient to raise the temperature of the solder to its melting temperature, while minimizing or reducing the heating of the surrounding assembly. In some embodiments, the transient current pulse assists in keeping the predetermined second temperature below the threshold temperature, but is not necessary for operability. Additionally, the minimization of heating provided by the transient current pulse may assist in avoiding problems cause by thermal mismatch. Additionally, in other embodiments, the heater 304 may be heated in a steady state mode of operation to melt the solder 311. The specific characteristics of the electricity provided to the heater 304 may vary depending on a number of parameters, such as heater composition and thickness, solder composition and volume, desired heating time, and other parameters. In some embodiments, voltages between 1-5 V are used for the heater. In particular embodiments, employing NiFe heaters, voltages are between 1.9 and 2.7 V.

Figure 4:
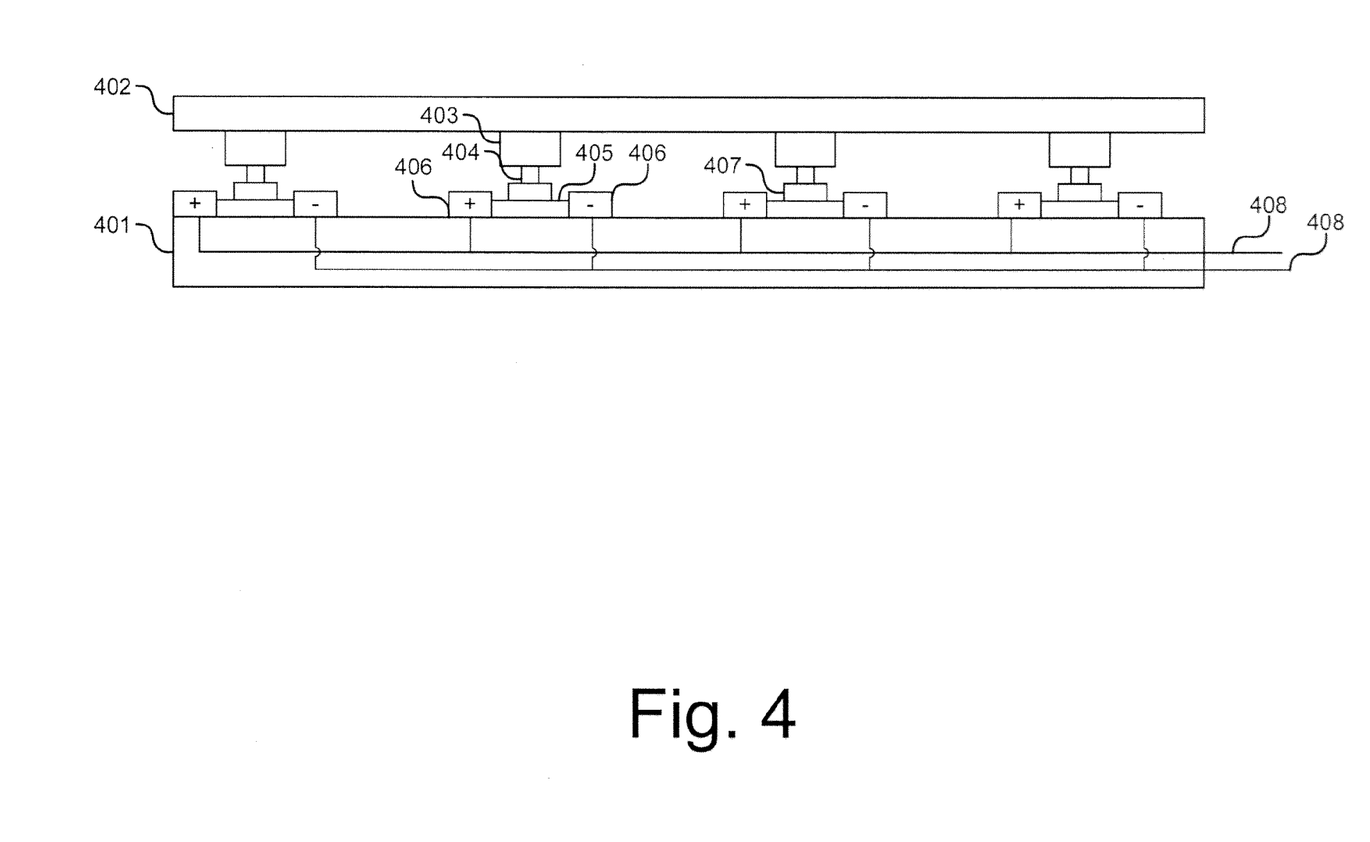
FIG. 4 illustrates a method of bonding multiple laser mounts to multiple sliders.

FIG. 4 illustrates mass manufacture of assemblies according to an embodiment of the invention. As described above, in some embodiments, rows of components are manufactured in parallel using pseudo-wafers. FIG. 4 illustrates a row 401 of substrate sub-assemblies as may be disposed on such a pseudo-wafer. Each subassembly comprising a heater 405, a pair of contacts 406, a UBM 407 and a solder pad 404. A corresponding row 402 of components 403 is applied to the row 401 such that solder pads on the components 403 align with the sold pad 404. The contacts 406 of the row are all connected to a current source in a parallel configuration using connections 408. Accordingly, by providing current to the heaters 405, the entire row may be bonded simultaneously.

Figure 5:
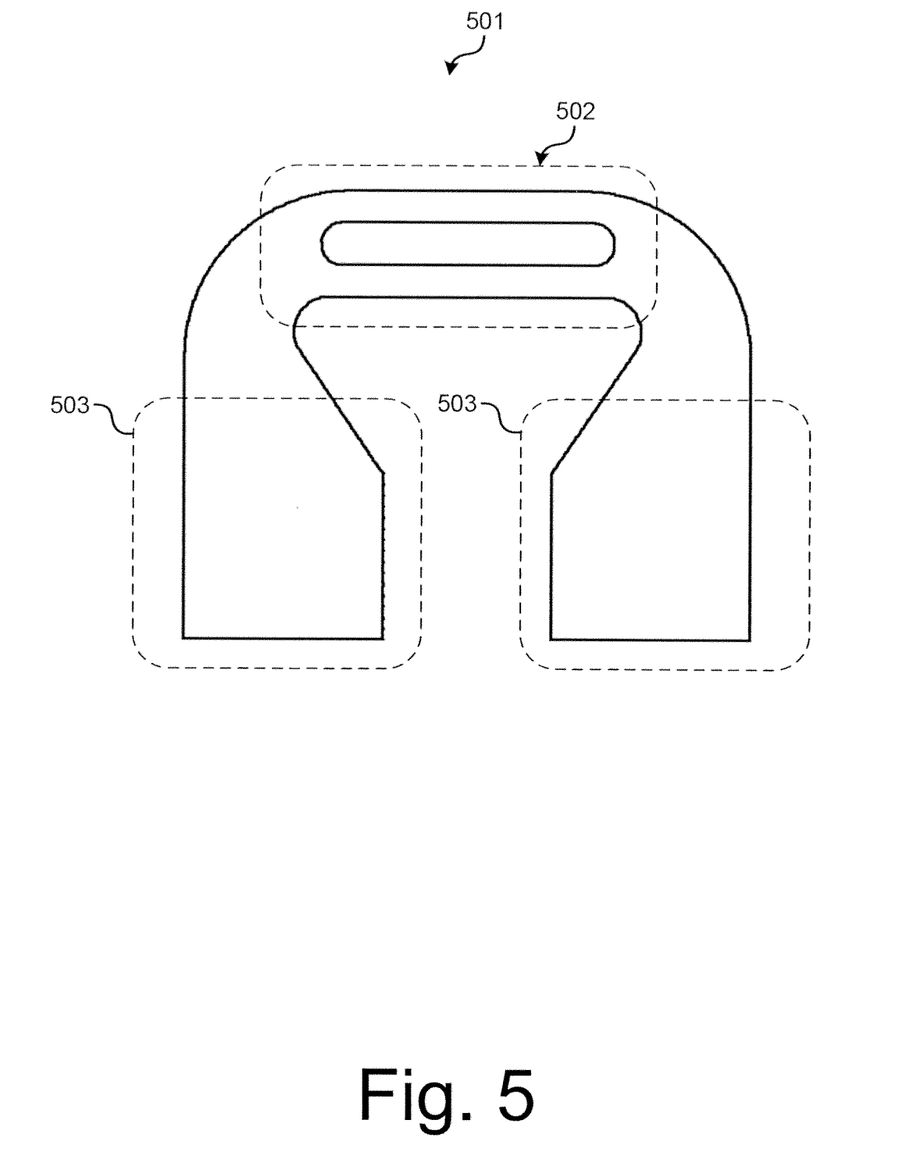
FIG. 5 illustrates a specific design of an integrated solder pad heater.

FIG. 5 illustrates an example thin-film heater design for use in embodiments of the invention. The illustrated heater 501 comprises a heater portion and two contact portions 503. The heater portion is configured to be partially or completely disposed underneath a UBM and solder pad. The contact portions 503 are configured to be coupled to electrical contacts to provide the heating current. In operation, the heater portion 502 rises to a sufficient temperature to melt the solder, while the electrical contact portions stay below the temperature. Various other thin-film heating designs may be employed in other embodiments according to desired thermal profiles.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A device assembly, comprising:
a substrate;
a heating element deposited over the substrate at a first location;
an under-bump metallization layer deposited over the heating element; and
a solder pad deposited over the under-bump metallization layer;
wherein the heating element is configured such that when the heating element is heated to the melting temperature of solder deposited on the solder pad, a device coupled to the substrate at a predetermined second location does not rise to a predetermined temperature.

2. The device assembly of claim 1, further comprising:
a first insulting film deposited on the wafer, wherein the heating element is deposited on the first insulating film; and
a second insulating film deposited on the heating element, wherein the under-bump metallization layer is deposited on the second insulating film.

3. The device assembly of claim 1, further comprising:
a pair of electrical contacts deposited on the heating element.

4. The device assembly of claim 3, wherein the pair of electrical contacts are sacrificial.

5. The device assembly of claim 1, wherein the solder pad is deposited over a periphery of the under-bump metallization layer.

6. The device assembly of claim 1, wherein the heating element comprises a layer of an alloy of Ni and Fe.

7. The device assembly of claim 1, wherein the heating element is configured to provide a predetermined heating profile to the solder pad.

8. The device assembly of claim 1, wherein the solder pad comprises Au and Sn.

9. The device assembly of claim 1, wherein the substrate comprises an air-bearing slider and the device coupled to the substrate at the predetermined second location comprises a portion of an aluminum oxide wafer.

10. The device assembly of claim 1, wherein the device coupled to the substrate at the predetermined second location comprises a magnetic read/write head.

11. The device assembly of claim 1, further comprising a laser mount bonded to the solder pad.

12. The device assembly of claim 1, wherein the heating element is completely contained under the solder pad.

13. A method, comprising:
depositing a heating element over a substrate;
depositing an under-bump metallization layer over the heating element; and
depositing a solder pad over the under-bump metallization layer;
wherein the heating element is configured such that when the heating element is heated to the melting temperature of solder deposited on the solder pad, a device coupled to the substrate at a predetermined second location does not rise to a predetermined temperature.

14. The method of claim 13, further comprising depositing sacrificial electrical contacts on the heating element.

15. The method of claim 14, wherein the step of depositing the sacrificial electrical contacts is performed simultaneously with the step of depositing the under-bump metallization layer.

16. The method of claim 13, further comprising depositing the solder pad over a periphery of the under-bump metallization layer.

17. The method of claim 13, wherein the heating element comprises a layer of an alloy of Ni and Fe.

18. The method of claim 13, wherein the heating element is configured to provide a predetermined heating profile to the solder pad.

19. The method of claim 13, wherein the substrate comprises an air-bearing slider and the device coupled to the substrate at the predetermined second location comprises a portion of an aluminum oxide wafer.

20. The method of claim 13, wherein the device coupled to the substrate at the predetermined second location comprises a magnetic read/write head.

21. The method of claim 13, further comprising bonding a laser mount to the solder pad.

22. The method of claim 13, wherein the heating element is completely contained under the solder pad.

23. A method, comprising:
applying solder to a solder pad,
the solder pad deposited over an under bump metallization layer,
the under bump metallization layer deposited over a heating element,
the heating element deposited over a substrate;
applying a laser mount to the solder;
melting the solder by heating the heating element without heating a device coupled to the substrate at a predetermined location to a predetermined temperature.

24. The method of claim 23, wherein the heating element is completely contained under the solder pad.

25. The method of claim 23, wherein the substrate comprises an air-bearing slider and the device coupled to the substrate at the predetermined second location comprises a portion of an aluminum oxide wafer.

26. The method of claim 23, wherein the device coupled to the substrate at the predetermined second location comprises a magnetic read/write head.

\* \* \* \* \*